Oct. 20, 1970     G. LE BOUTEILLER     3,534,558
FLOATING BREAKWATERS

Filed Dec. 22, 1967     4 Sheets-Sheet 2

INVENTOR
GAETAN LE BOUTEILLER
BY
John J. Hart
ATTORNEY

Oct. 20, 1970     G. LE BOUTEILLER     3,534,558

FLOATING BREAKWATERS

Filed Dec. 22, 1967     4 Sheets-Sheet 3

INVENTOR
GAETAN LE BOUTEILLER
BY

*John J. Hart*
ATTORNEYS

Oct. 20, 1970  G. LE BOUTEILLER  3,534,558
FLOATING BREAKWATERS
Filed Dec. 22, 1967  4 Sheets-Sheet 4

INVENTOR
GAETAN LE BOUTEILLER
BY
John J. Hart
ATTORNEY

# United States Patent Office 3,534,558
Patented Oct. 20, 1970

3,534,558
FLOATING BREAKWATERS
Gaetan Le Bouteiller, Villard-de-Lans, France, assignor to Societe Grenobloise d'Etudes et d'Applications Hydrauliques (Sogreah), Grenoble, France, a corporation of France
Filed Dec. 22, 1967, Ser. No. 692,826
Claims priority, application France, Dec. 23, 1966, 5,031
Int. Cl. E02b 3/10
U.S. Cl. 61—5                          13 Claims

ABSTRACT OF THE DISCLOSURE

The useful effect of the rolling motion of floating breakwaters in opposing wave propagation is increased by giving the float such dimensions, shape, or moorage as to reduce the natural heaving motion of the breakwater or make it out of phase with the wave motion.

This invention relates to floating breakwaters and its primary purpose is to provide an improved floating breakwater capable of opposing wave motion more effectively than the floating breakwaters now in use.

Most floating breakwaters that have been heretofore employed have been designed as wave obstacles to oppose wave propagation by acting as reflectors. This type of system however, has not come into general use, not only because it is only relatively effective, but also because of the difficulty of maintaining it in position without the risk of its moorings failing.

It has been found that a float subjected to wave action assumes an ellipsoidal motion which can be broken down into the following:

(a) An alternating rotary motion, known as rolling,
(b) An alternating vertical motion, known as heaving, and
(c) Horizontal displacement.

The aforesaid ellipsoidal motion, it has been found, results from the orbital motions of the water particles in the wave, which are circular or ellipsoidal if the depth of the water is finite, and unclosed due to the slight mass transport which accompanies wave propagation.

The various float motions associated with the wave motions are more or less pronounced depending upon the wave characteristics. A float has its own natural motions which differ from those of other floats because of its construction and are characterized by its natural rolling and heaving periods. The impulses imparted by the waves effect these natural motions of a float to varying degrees depending upon the degree of correspondence between the wave period and the natural float periods.

I have found that the natural rolling motion of a float can be used very effectively to oppose wave propagation. Under wave action, the float rotates about an axis lying in the vertical plane of symmetry of the float and located below the floating or water line of the float. As a result, the motion of that side of the float which is exposed to the waves, is out of phase with the wave motion and such side acts as a wave paddle against the waves as well as reflecting them back by virtue of its presence. This wave paddle action against the waves is most effective when the natural rolling period of the float and the natural wave period are similar.

I have also found that the natural heaving action of the float does not oppose wave propagation, but instead assists it. Thus, tests have shown that when the natural heaving motion of the float is in phase with the wave motion, the float will rise at same time as the wave, thus letting the wave motion pass under it and consequently rendering its obstacle characteristic ineffective so that it does not oppose the wave propagation. This unimpeded vertical up-'and-down motion of the float corresponds to the wave crest-to-trough variations, thereby facilitating transmission. Even if the float is rolling, as well as heaving, the latter motion predominates and thus neutralizes the favorable effect of the rolling motion. This neutralizing action is felt as soon as the wave period approaches the natural heaving period of the float.

I have further found that the horizontal float motion or displacement has a slight retardation effect upon both its rolling and heaving motions and especially on the former.

Based on the aforesaid observations, I have devised several floating breakwater arrangements which are capable of increasing the useful effect of the rolling motion of such breakwaters, while reducing and even cancelling out the adverse effect of their heaving motion. In accordance with this invention, said arrangements embody the following essential characteristic features either individually or in combination:

(1) The breakwater float is moored in a manner enabling it to oscillate freely about its instantaneous rolling center.

(2) The float is so moored that its horizontal motion is reduced to a minimum.

(3) The float is given such inertia, dimensions, load distribution, and shape as to provide it with a natural rolling frequency which will match that of the strongest, most dangerous waves that it is expected the float will be subjected to, in order that it may be enabled to effectively oppose the wave motion of such waves.

(4) The float is given such dimensions and shape as to provide it with a higher natural heaving frequency than that of the waves it is likely to encounter, so that it will not heave in phase with the waves in the range thereof likely to occur.

(5) Causing the float to heave out of phase with the wave motion in a given range, by suspending therefrom, a sufficiently bulky load at the greatest possible depth underneath the float by an appropriate swinging attachment system.

(6) Eliminating the heaving motion of the float, while leaving its rolling motion unimpeded, by permitting the float to swing freely about a fixed horizontal axis.

Floating breakwater arrangements embodying the aforesaid features enable more effective types of structures to be built than is now possible with the present type of structures built solely on the principle of wave reflection. This added effectiveness as has been indicated is due to the use of wave-induced float motion, and especially rolling motion, to counteract wave propagation. The arrangements of this invention also have the advantage that they will not overload the float mooring and attachment arrangements, which then no longer have to absorb the very high stresses usually involved in restraining the freedom of movement of present type reflector breakwaters.

The selection of the aforesaid features for a given floating breakwater i.e., dimensions, weight, load distribution, shape, mooring system, etc., will be such as to insure optimum effectiveness of the breakwater under the existing local conditions in which it will be used. The manner in which such features are selected is known to the art and can readily be determined by scale model tests in accordance with the practice of the art.

For a better understanding of the invention, reference is made to the following description and to the accompanying drawings which show by way of example a number of arrangements by which the invention may be practiced, and in which.

Figure 1:
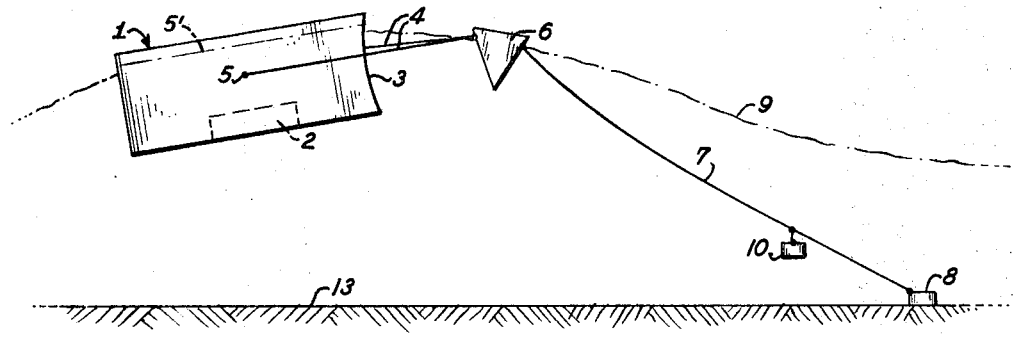
FIG. 1 shows a diagrammatic side elevational view of a floating breakwater embodying the invention, the breakwater being shown with an inertia float and a flexible mooring system.

Referring now more particularly to FIG. 1 of the drawings, the reference numeral 1 indicates generally an inertia float having dimensions, load distribution and shape selected for the longest waves against which protection is sought in a particular locality. In designing this float, its weight and dimensions are first chosen with the view of giving the float a higher natural heaving period than the period of the longest waves it will encounter while allowing for the fact that the natural heaving period of this type of body is proportional to the square root of its weight in accordance with the known formula $$\text{heavy period} = \sqrt{\frac{M}{S}}$$

in which

M is the mass of the float, and
S is its floating surface.

The weight of the float therefore should be selected with this fact in mind, and being equal to the weight of water displaced, it determines the cross-sectional area of the part of the float under water. This cross-sectional area should be such as to result in a draught matched to the local conditions and the length of the flotation line to the wave length. In this way, protection against wind and waves can be provided by a float of comparatively small dimensions. In accordance with the invention, it is preferred that the said cross-sectional area selected should be such that the portion of the float out of the water is about 10 to 15% of its height.

Having thus determined the float dimensions and weight in terms of its heaving period, the weight of the float should then be distributed in such a way as to extend its rolling period range as much as possible in order to cover the most frequent wave period range and to make its natural rolling period the same as that of the strongest waves; the effectiveness of the float will be at a maximum in the neighborhood of this period. The determination of this rolling period will depend on the inertia of the float and its center of gravity, both parameters being directly connected with the load distribution in the float. Several different load distributions can be envisaged. As one extreme case the load distribution may be such that the float affords protection over a fairly wide wave range with a certain transmission tolerance. To accomplish this result the load should be uniformly distributed, as by providing the float with a liquid load and constructing the float with appropriate partitioning to prevent surging of the liquid inside it. As another extreme case the load distribution can be such that the float only affords fully effective protection over a very limited wave period range. In this latter case the float will be provided with a load which is concentrated in the bottom and central part of the float, such as the load 2 shown in the float 1 depicted in FIG. 1 of the drawings. This load 2 should be from 30% to 50% of the total weight of the float in order to obtain the desired results.

The floating seaward side 3 of the float should be configured to provide the highest possible wave reflecting capacity. It has been found that a concave shape for such seaward side 3 will provide the highest reflecting capacity.

The float 1 of FIG. 1 is moored by a flexible system composed of two cables 4 each connected at one end to one side of the float on its float oscillation axis 5 which is located in the vicinity of the center of the float's flotation line 5'. The other ends of the cables 4 are connected to a buoy 6 on the seaward side of the float. The buoy 6 which preferably is a conical buoy as indicated, is held fast to the sea bed 13 by a cable 7 attached to a sinker 8. As a result of this arrangement the float 1 will be free to roll about the axis 5 passing through its instantaneous rolling center; the points of attachment of the cables 4 on such axis being preferably equally spaced from such instantaneous rolling center. It is to be noted that rolling loads on the arrangement are reduced owing to the fact that the float is free to oscillate, except for tensile loads produced by the limited horizontal float displacement. Being only moored on the seaward side, the float is able to move sideways if the wave direction changes and is readily adaptable to a sea in which a strong tide is running.

In the event of an exceptionally wide variation in the water level 9, an additional weight 10 may be required on the mooring cable 7 to maintain the system in position. Thus, the weight 10 will normally seat on the sea bed or bottom 13, but will rise therefrom if the variation in the water level is sufficiently great, to maintain the buoy 6 in position. The buoy 6 is designed to absorb the load due to this additional weight 10 so as to ensure that the latter does not unduly effect the characteristics of the float 1, especially its draught.

Following is an example of a float 1 designed in accordance with the invention to give protection for waves having a frequency of 3 to 4 seconds:

Length of the float—from 6.50 to 7 m.
Height of the float—from 1.60 to 2.70 m.
Draught of the float—from 1.40 to 2.40 m.

The weight 2 as previously indicated will constitute from 30 to 50% of the total weight of the float.

Figure 2:
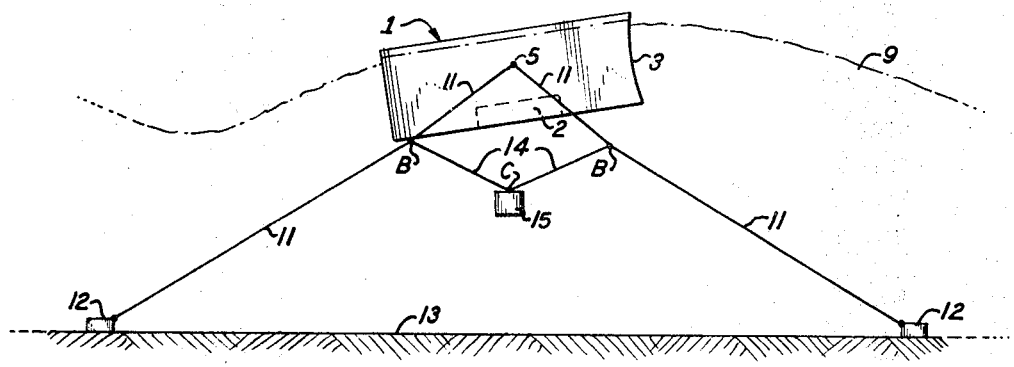
FIG. 2 is a similar view showing an alternative to the flexible mooring system of FIG. 1.

FIG. 2 of the drawings shows a float 1 similar to that depicted in FIG. 1, but provided with a flexible mooring system which is more suitable for a sea without any appreciable tide.

In the arrangement of FIG. 2, the float 1 is held to the sea bed 13 by two groups or sets of two cables, the two cables 11, 11 in each set being connected at one end to the same place on one of the sides of the float, namely on the floatation axis 5 of the float, but extending in opposite directions from such place to the sea bed 13 so that they are disposed in angular relation. At their lower ends each of the four cables are attached to sinkers 12. Connected to an intermediate portion of the two cables 11 in each set is one end of a cable 14; such cable 14 extending downwardly from such place of connection to a suspended weight 15. Thus, the two cables 14 connected to each set of two cables 11 form with the latter, a triangulation system 5BC, and the weight 15 held suspended thereby at the point C of such system maintains the cables 11 in a taut condititon. This system helps to maintain the float 1 in position without horizontal displacement of the latter and ensures a symmetrical load distribution so that the float is more effective as its rolling motion undergoes less disturbance. The weight 15 is calculated for the specific purpose of maintaining adequate mooring cable tension and allowance therefore is made in determining the float characteristics. It is within the contemplation of this invention to use but one weight 15 for the two sets of cables 11, instead of two of such weights 15 for the two sets of cables 11 as above explained. When one such weight 15 is used, it is suitably connected to the two sets of cables, such as by connecting the lower ends of each of the four cables 14 to such single weight.

Figure 3:
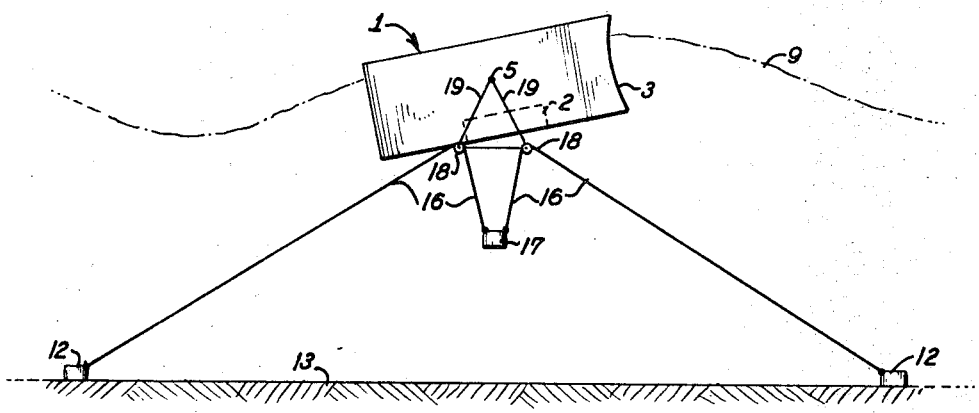
FIG. 3 is also a view similar to FIG. 1 and showing a further alternative to the flexible mooring system of FIG. 1.

FIG. 3 of the drawings shows another mooring arrangement for the float 1 to the sea bed 13. The mooring arrangement of FIG. 3 is of special advantage in tidal seas and is composed of two sets of mooring members, each set thereof comprising a rigid triangle 19 which is connected to a side of the float 1 so that its apex is free to rotate about the float oscillation axis 5 passing through the rolling center of the float. The two bottom corners of the rigid triangle 19 are provided with pulleys 18 over which run the mooring cables 16, 16. The two cables 16 are connected at one end to a weight 17 for keeping such cables taut and at their other ends are attached to sinkers lying on the sea bed 13. It will thus be seen that the float 1 is free to be displaced vertically in conformance with the changes in tide without changing its position horizontally, the cables 16 running freely through the pulleys 18 during such changes to adjust the position of the weights 17. As in the case of the construction shown in FIG. 2, there may be a single weight 17 associated with the two sets of mooring members, the four cables 16 in the two sets being connected to such single weight.

Figure 4:
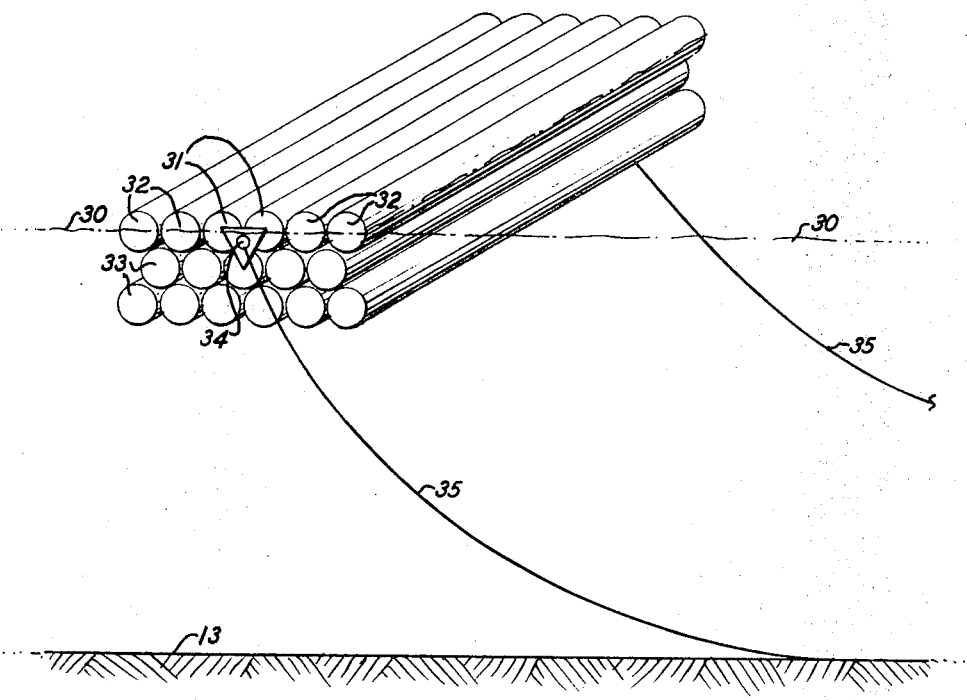
FIG. 4 is a perspective view showing one form of inertia float.

The float shown in FIG. 4 of the drawings is an inertia float consisting of a plurality of closely packed empty or full tubes with open or sealed ends depending upon the required inertia characteristics which are calculated in the same way as in the case of the float 1 shown in FIG. 1. The tubes are rigidly interconnected and form an assembly which is roughly rectangular in outline and the major portion of which is below the water surface indicated by the line designated 30. In the assembly illustrated, the tubes 31 have sealed ends and are filled with water or sand or some other suitable ballast material. The tubes 32 are also sealed, but are filled with air so that they function as floats. The submerged float tubes 33 are open-ended so that they fill up when immersed and so that their water content then acts as a dynamic load. Some of these tubes 33 could also be sealed and filled with a material heavier than water, such as for example, sand or concrete, which would move the center of gravity of the float lower down. The mooring cables 35 are attached to the ends of the tube assembly forming the float at the places 34 located on the float assembly axis so that the float is enabled to oscillate about its instantaneous rolling center.

It will be observed that the above described float of FIG. 4 is an example of a uniform load distribution combined with a concentrated load distribution. Thus, the water content in the submerged open-ended tubes 33 acts as an evenly distributed load, while the load in the sealed tubes 31 acts as a concentrated load. It will of course be understood, that the ballast and float distribution, the number of tube layers, and tubes in a layer, and the overall float outline, may vary in accordance with the required inertia characteristics, and how and when the breakwater is installed. The method of individual tube attachment is not shown for the sake of simplicity, but any suitable type of fitting may be used for this purpose.

Figure 5:
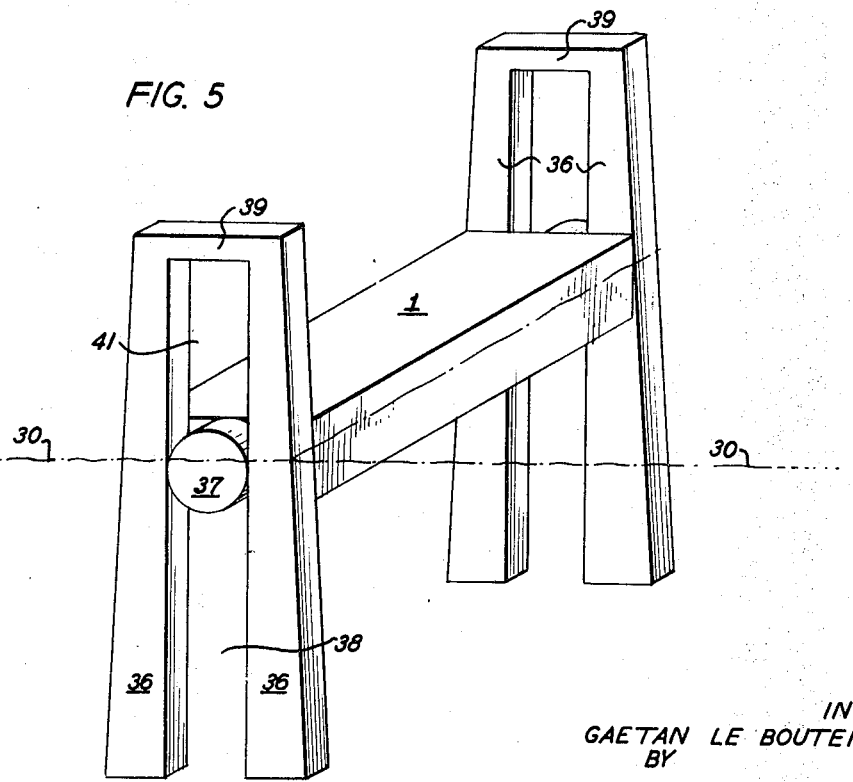
FIG. 5 is a perspective view of a breakwater and inertia float such as shown in FIG. 1, but held by fixed supports.
Figure 6:
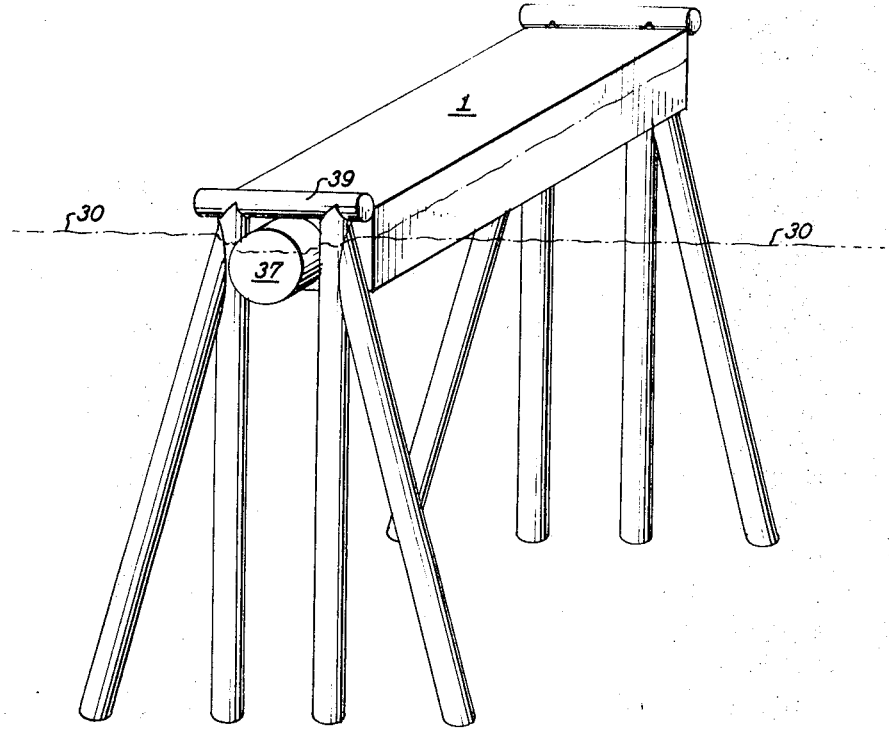
FIG. 6 is a perspective view of an alternative to the arrangement shown in FIG. 5.

FIG. 5 of the drawings shows an inertia float 1 similar to that shown in FIG. 1, but which is held in position by two spaced, fixed supports which rest on the bottom of the sea and which prevent horizontal movement of the float so that there is no retardation effect. Each of the supports is composed of two uprights or legs 36, 36 defining therebetween a vertical slot 38 having a height greater than the variations of the water level 30 with the changes of tide. The float 1 is provided at each of its ends with integrally connected boss 37 that is positioned in the vicinity of the rolling center of the float and slidably engages with one of the support slots 38. Thus, the float 1 is free to slide up and down between the two supports with the changes in the tide level. As a result of this construction the float 1 is also free to rotate about the centerline of the bosses 37. Thus favorable conditions are created for the rolling motion of the float since the latter can take place undisturbed by horizontal float movements. In a fixed support arrangement of this type, one could also prevent any vertical breakwater displacement so as to eliminate heaving substantially entirely by modifying such arrangement as follows:

(a) Where the support arrangement is to be used in a location having tideless conditions, the top cross member 39 connecting the upper ends of the legs of each support can be lowered so that the tops of the bosses 37 which are partially submerged in the water, the level of which is indicated by the numeral 30, will bear against such cross members 39. Such an arrangement is shown in FIG. 6 of the drawings. Should it be desired in the arrangement of FIG. 6 to prevent the bosses 37 from hitting the cross member 39 under slight vertical float movements, the position of the bosses can be stabilized by the addition of lower cross members that may be detachably connected in any suitable manner to the support legs beneath the bosses.

(b) When tidal conditions are present at the particular location, the arrangement in FIG. 5 may be modified to enable the float to follow changes in the water level 30 without moving up and down with the waves, such as by incorporating in such arrangement an automatic tide-controlled rack-and-pinion system as will be evident to those skilled in this art. The heaving motion of the float could be put out of phase by adding a damping device to the arrangement in the upper part of the guide slot at 41.

Figure 7:
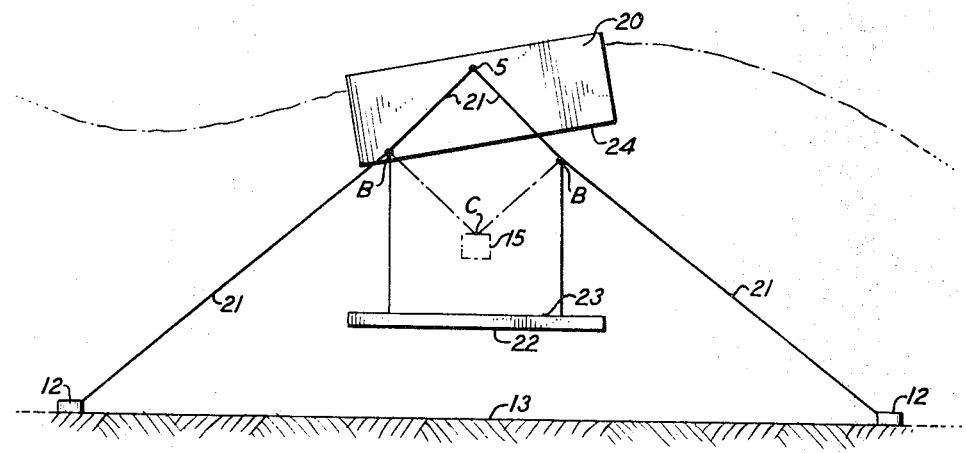
FIG. 7 is a diagrammatic view similar to FIG. 4 and shows a breakwater composed of a light float and a counterweight.

FIG. 7 of the drawings shows a float moored by an articulated system similar to that shown in FIG. 2 and composed of cables 21 connected at one of their ends on the oscillation axis 5 of the float and at their other ends to the sinkers 12.

The float 20 in the arrangement shown in FIG. 7 is comparatively light and is maintained at the requisite draught by a weight 22 suspended from the articulated mooring system and constituting one half the weight of the float so that the relationship of the weight of the float 20 and the load 20 is about 50%—50%. The weight 22 in the form of a plate, is suspended from points B of the mooring system and is submerged at the greatest possible depth. By its mass the weight 22 creates favorable rolling conditions by acting as a stabilizer to maintain the float in position. It limits any other possible movements thus allowing perfectly regular rolling motion to take place and ensuring that such rolling motion will be undisturbed by longitudinal or vertical movements. A further effect of the weight 22 is to delay the response of the overall system so that its heaving motion is out of phase with respect to the waves, this being the effect sought after with a view of effectively countering the latter. The shape and size of the horizontal area of the weight 22 and its depth of immersion help to put the heaving motion of the float out of phase with the waves as they cause the entrainment of a large volume of water in the space between the top face 23 of the weight 22 and the bottom face 24 of the float 20. Thus, in determining features of this system using the previously noted heaving formula, the mass to be considered in such formula is that of both the float 20 and the suspended load 22, and taking into consideration also, the volume of water entrained in the space between the weight 22 and the float 20. The weight 22 like the weight 15 of FIG. 2 also maintains the mooring cables 21 sufficiently taut. As indicated in FIG. 7, the weight 15 can also be added to this system and it will improve the effect of the main weight by evening out the various movements and supplementing the tension on the mooring cables.

Figure 8:
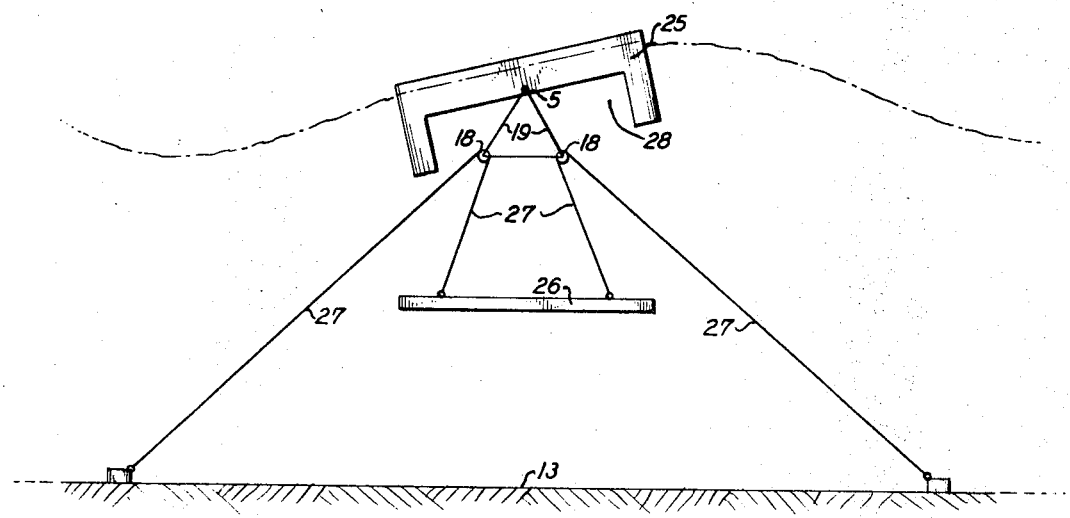
FIG. 8 is a diagrammatic view of an alternative version of the light float and mooring system shown in FIG. 7.

FIG. 8 shows a light float arrangement similar to FIG. 7, but provided with a mooring system such as shown in FIG. 3 of the drawings. Thus in the arrangement of FIG. 8, the light float 25 has suspended therebelow a weight 26 in the form of a plate in the manner of the arrangement of FIG. 7. The weight 26 is held suspended by cables 27 which run over pulleys 18 carried by rigid triangles 19 and which hold the float to the sea bed in the manner of the mooring system shown in FIG. 3. This arrangement is especially suitable for strong tidal conditions.

The float 25 of FIG. 8 differs from the float 20 of FIG. 7 in that it has a hollowed out shape to provide a cavity 28 in the underside thereof. The advantage of this construction is that there is stored in the cavity 28 a certain volume of water which is kept inert by the float walls and which improves the float characteristics.

Figure 9:
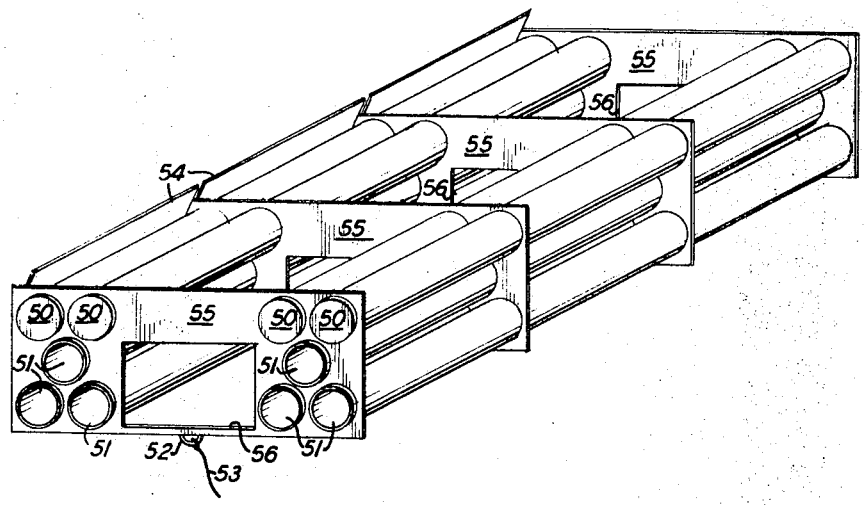
FIG. 9 is a perspective view of another form of inertia float.

FIG. 9 of the drawings shows an inertia float made of tubes in the manner of the float shown in FIG. 4, but constructed so as to entrap a volume of water as in the construction of FIG. 8. As is shown in FIG. 9, the float is composed of a plurality of transverse vertical tube holding plates 55 constructed to secure the tubes together in two horizontally spaced groups. Each of the plates 55 is provided in the areas thereof spanning the space between the two groups of tubes with an opening 56 approximating the transverse area of such spaces. Thus the mass of water contained in the open space defined by the opening 56 all along the length of the float will act generally by its inertia.

With respect to the two groups of tubes, the tubes 50 in each group are sealed and empty. They therefore act as floats. The submerged tubes 51 in each group are open ended so that they fill up when immersed and their water content will then act as a distributed load in the float.

On the seaward side of the float, the plates 55 support a deflecting plate 54 to oppose the wave motion above the waterline. The float is provided along its bottom at the central part of the float with two end anchoring members 52 and a third similar anchoring member located approximately midway of the length of the float. Attached to each of the three anchoring members 52 is a cable 53 by which the float is secured to the sea bed. As a result of this flexible mooring system, the float shown in FIG. 9 is free to roll substantially about its normal oscillation axis even though it is not actually connected on such oscillation axis in the manner of the float shown in FIG. 4 of the drawings.

While there has been hereinabove described and illustrated in the drawings a number of examples in which the invention may be practiced, it is to be understood that the invention is not to be limited to such examples, but includes within its scope modifications thereof. Thus, for example, the side elevation of the floats can be given some other shape than the rectangular one shown for purposes of illustration. It is accordingly intended to cover all embodiments of the invention coming within the scope of the appended claims.

What is claimed is:

1. A floating breakwater comprising a float having a generally rectangularly-shaped body provided with a wave reflecting longitudinal side and constructed to provide it with a given natural rolling frequency capable of matching that of the strongest wave in a given range of waves, said float having a longitudinal dimension in its vertical transverse section which is at least twice as long as high and being submerged for the major portion of such height, and said float having a horizontal oscillating axis lying in the vertical plane of symmetry of the float and located below the floating line of such float, whereby said horizontal oscillating axis is submerged and said float swings about such submerged oscillating axis, and means for anchoring said float, said anchoring means being connected to said float at spaced longitudinal positions located in said plane of symmetry and constructed and arranged to permit the float to oscillate freely substantially about its oscillating axis.

2. A floating breakwater as claimed in claim 1, in which said float body is constructed to provide a concentration of its weight in the bottom and central part thereof.

3. A floating breakwater as claimed in claim 1, in which said float is constructed to give it a higher natural heaving frequency than the heaving frequencies of the waves in said given range thereof.

4. A floating breakwater as claimed in claim 1, including a bulky load suspended below said float body at a substantial depth beneath it, and means swingingly connecting said load to said float body, thereby to cause said float body to heave out of phase with the motion of the waves in said given range thereof.

5. A floating breakwater as claimed in claim 1, in which said anchoring means is constructed and arranged to reduce the horizontal movement of the float body to a minimum, without substantial restraint of its oscillating movement.

6. A floating breakwater as claimed in claim 1, in which said anchoring means is constructed and arranged to reduce the heaving movement of the float body to a minimum, without substantial restraint of its oscillating movement.

7. A floating breakwater as claimed in claim 1, in which said anchoring means is constructed and arranged to hold said float body in position with said wave reflecting longitudinal side thereof disposed to seaward, and in which said seaward side of the float is configured to provide it with high wave reflecting capacity.

8. A floating breakwater as claimed in claim 1, in which said anchoring means includes a plurality of anchoring cables secured to the sea bed, and means connected to said cables to maintain said cables taut, said anchoring cables and maintaining means being constructed and arranged to maintain the position of the float while enabling the float to follow variations in height of the water surface.

9. A floating breakwater as claimed in claim 1, in which said anchoring means includes a plurality of anchoring cables secured to the sea bed, a weight suspended below said float body at a substantial depth beneath it, and means connecting said weight to said cables intermediate said float body and the sea bed.

10. A floating breakwater as claimed in claim 1, in which said anchoring means comprises a pair of spaced uprights resting on the sea bed and located adjacently to each end of the float body to provide substantially vertical guideways adjacent to the float body ends, and a circular member projecting from each end of the float body in the vicinity of the oscillating center thereof and slidably engaging with the guideway of the associated pair of uprights, whereby the float body is maintained in a given horizontal position yet enabled to follow all variations in height of the water surface.

11. A floating breakwater comprising a float composed of a plurality of tubes, certain of said tubes being empty and certain of said tubes being filled with ballast material, and said float being constructed to provide it with a given natural rolling frequency capable of matching that of the strongest wave in a given range of waves, said float having a longitudinal dimension in its vertical transverse section which is at least twice as long as high and being submerged for the major portion of such height, and said float having a horizontal oscillating axis lying in the vertical plane of symmetry of the float and located below the floating line of such float, whereby said horizontal oscillating axis is submerged and said float swings about such submerged oscillating axis, and means for anchoring said float, said anchoring means being connected to said float at spaced longitudinal positions located in said plane of symmetry and constructed and arranged to permit the float to oscillate freely substantially about its oscillating axis.

12. A floating breakwater as claimed in claim 11, in which certain of said tubes are immersed, open ended tubes and are filled with sea water as the ballast material.

13. A floating breakwater as claimed in claim 11, in which said tubes are arranged in a plurality of spaced groups to provide an open space all along the float between such groups.

References Cited

UNITED STATES PATENTS

| | | | |
|---|---|---|---|
| 226,663 | 4/1880 | Kirkup | 61—5 |
| 877,201 | 1/1908 | Kellner | 61—3 |
| 1,004,718 | 10/1911 | Wieland | 61—5 |
| 1,432,530 | 10/1922 | Chance | 61—5 |
| 2,972,233 | 2/1961 | Askevold | 61—5 |
| 3,191,202 | 6/1965 | Handler | 9—8 |
| 3,197,963 | 8/1965 | Frederiksen | 61—6 X |
| 3,276,210 | 10/1966 | Stitt | 61—5 |
| 3,304,560 | 2/1967 | Kiefer | 9—8 |
| 3,353,361 | 11/1967 | Lloyd | 61—3 |
| 3,357,192 | 12/1967 | Hibarger | 61—5 |

PETER M. CAUN, Primary Examiner